United States Patent
Pullen

(10) Patent No.: US 8,369,348 B2
(45) Date of Patent: Feb. 5, 2013

(54) METHOD, AND SYSTEM, AND COMPUTER PROGRAM PRODUCT FOR DYNAMICALLY ADJUSTING ACKNOWLEDGEMENT FILTERING FOR HIGH-LATENCY ENVIRONMENTS

(75) Inventor: David Pullen, Buford, GA (US)

(73) Assignee: Broadcom Corporation, Irvine, CA (US)

( * ) Notice: Subject to any disclaimer, the term of this patent is extended or adjusted under 35 U.S.C. 154(b) by 419 days.

(21) Appl. No.: 12/035,089

(22) Filed: Feb. 21, 2008

(65) Prior Publication Data

US 2009/0190604 A1 Jul. 30, 2009

Related U.S. Application Data

(60) Provisional application No. 61/006,701, filed on Jan. 28, 2008.

(51) Int. Cl.
*H04L 12/28* (2006.01)
*H04L 12/56* (2006.01)

(52) U.S. Cl. ........................ 370/412; 370/428

(58) Field of Classification Search .................. None
See application file for complete search history.

(56) References Cited

U.S. PATENT DOCUMENTS

| | | | |
|---|---|---|---|
| 6,252,851 B1 * | 6/2001 | Siu et al. ................ | 370/236 |
| 6,434,620 B1 | 8/2002 | Boucher et al. | |
| 6,473,425 B1 | 10/2002 | Bellaton et al. | |
| 6,687,227 B1 | 2/2004 | Li et al. | |
| 6,894,974 B1 | 5/2005 | Aweva et al. | |
| 6,928,052 B2 | 8/2005 | Packer | |
| 7,145,887 B1 | 12/2006 | Akgun et al. | |
| 2003/0223422 A1 | 12/2003 | Igarashi et al. | |
| 2004/0085915 A1 | 5/2004 | Gronau et al. | |
| 2004/0165538 A1 * | 8/2004 | Swami .................. | 370/252 |
| 2004/0202166 A1 | 10/2004 | Dillon | |
| 2004/0205770 A1 | 10/2004 | Zhang et al. | |
| 2004/0213278 A1 | 10/2004 | Pullen et al. | |
| 2006/0034176 A1 * | 2/2006 | Lindsay .............. | 370/236 |
| 2007/0286073 A1 | 12/2007 | Pullen et al. | |

FOREIGN PATENT DOCUMENTS

| | | |
|---|---|---|
| EP | 1 180 869 A2 | 2/2002 |
| EP | 1 180 869 A3 | 2/2002 |
| WO | WO 00/79831 A1 | 12/2000 |
| WO | WO 01/31833 A1 | 5/2001 |

OTHER PUBLICATIONS

A European Search Report for EP Application No. 04009900.4, completed on Jan. 14, 2008 and issued on Jan. 25, 2008.
Balakrishnan H. et al., "The Effects of Asymmetry on TCP Performance", Mobicom, Proceedings of the Annual International Conference on Mobile Computing and Networking, pp. 77-89, Sep. 1997, XP000853511.

* cited by examiner

*Primary Examiner* — Chirag G Shah
*Assistant Examiner* — Minh-Trang Nguyen
(74) *Attorney, Agent, or Firm* — Sterne, Kessler, Goldstein & Fox P.L.L.C.

(57) ABSTRACT

A system and method for adjusting the filtering of acknowledgments (ACKS) in a TCP environment. State variables are used to keep track of, first, the number of times an ACK has been promoted into (a variable which can be stored on a per-packet basis along with the session ID), and second, the number of times an ACK is allowed to be promoted into (which can be global, or can be stored per-session).

21 Claims, 10 Drawing Sheets

METHOD, AND SYSTEM, AND COMPUTER PROGRAM PRODUCT FOR DYNAMICALLY ADJUSTING ACKNOWLEDGEMENT FILTERING FOR HIGH-LATENCY ENVIRONMENTS

CROSS REFERENCE TO RELATED APPLICATIONS

This application claims the benefit of U.S. Provisional Application No. 61/006,701, filed Jan. 28, 2008.

This application is related to U.S. Provisional Application 60/464,956, filed on Apr. 24, 2003, and to U.S. application Ser. No. 10/804,133, filed on Mar. 19, 2004.

BACKGROUND OF THE INVENTION

1. Field of the Invention

The invention described herein relates to data network communications, and in particular relates to packet communications and packet acknowledgments.

2. Background Art

In data communication protocols such as the transmission control protocol (TCP), acknowledgement (ACK) filtering tries to eliminate unnecessary ACK packets. This is possible because TCP ACK packets are cumulative—ACK packet 3 acknowledges all of the received data that ACK packet 2 acknowledges, plus an additional received segment. If ACK packets 2 and 3 are both queued for transmission, ACK packet 2 can be discarded, sending only ACK packet 3. This benefits both the network and the TCP stream by consuming less bandwidth, allowing the most recent ACK to be sent sooner (minimizing latency), reducing packet processing required by intermediate routers, etc.

However, there are scenarios where ACK filtering can be too aggressive, and can be harmful for the TCP stream. In particular, this occurs when there is a lot of latency between the TCP client and the TCP server (as is often the case on the Internet), and even more so when there is a lot of local transmit latency. This is often the case with upstream communications in systems configured and operating in accordance with a version of the Data Over Cable Service Interface Specification (DOCSIS) standard. The TCP server relies on the ACK pacing from the TCP client to send more TCP data packets; the farther apart ACK packets are, the farther apart data packets will be.

This problem is exacerbated by errors that cause TCP data packets from the TCP server to the TCP client to be lost (as is often the case on the Internet), since the client will wait for the missing packet to arrive, and will stop sending ACK packets or will send selective ACK packets to indicate that one or more data segments is missing. The end-to-end network latency is compounded with local transmit latency and the gap in ACK packets from the client, causing the server to delay sending TCP data packets, which further delays the client from sending ACK packets, and so on.

What is needed is a method and a system to dynamically adjust the TCP ACK filtering so that the benefits of ACK filtering can be preserved while minimizing harmful effects with high latency and lost data packets.

BRIEF DESCRIPTION OF THE DRAWINGS/FIGURES

Further embodiments, features, and advantages of the present invention, as well as the operation of the various embodiments of the present invention, are described below with reference to the accompanying drawings.

DETAILED DESCRIPTION OF THE INVENTION

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

The invention is described in terms of TCP packetized communications between entities, and can be applied to communications between a cable modem (CM) and a cable communications headend. These are not to be considered limitations on the applicability of the invention, however. The principles described herein could be applied to other forms of communications using other media and protocols.

When a TCP ACK packet is ready to be transmitted upstream by a CM, the CM calculates a session identifier (ID) value that identifies the TCP stream to which the ACK packet belongs. If another ACK packet with a matching session ID is already queued for transmission, fields are copied from the new ACK packet into the buffer containing the queued ACK packet, thus "promoting" the new ACK packet "into" the queued ACK packet. The new ACK packet can then be discarded.

This invention uses state variables, or filtering parameters, to track and control the number of times an ACK packet is promoted. One such variable records the number of times that a queued ACK packet has been previously promoted into, referred to herein as NumPromotions, which is stored on a per-packet basis along with the session ID. Another such variable stores the maximum number of times an ACK packet is allowed to be promoted, referred to herein as MaxPromotions, which can be global, or can be stored per-session.

Figure 1:
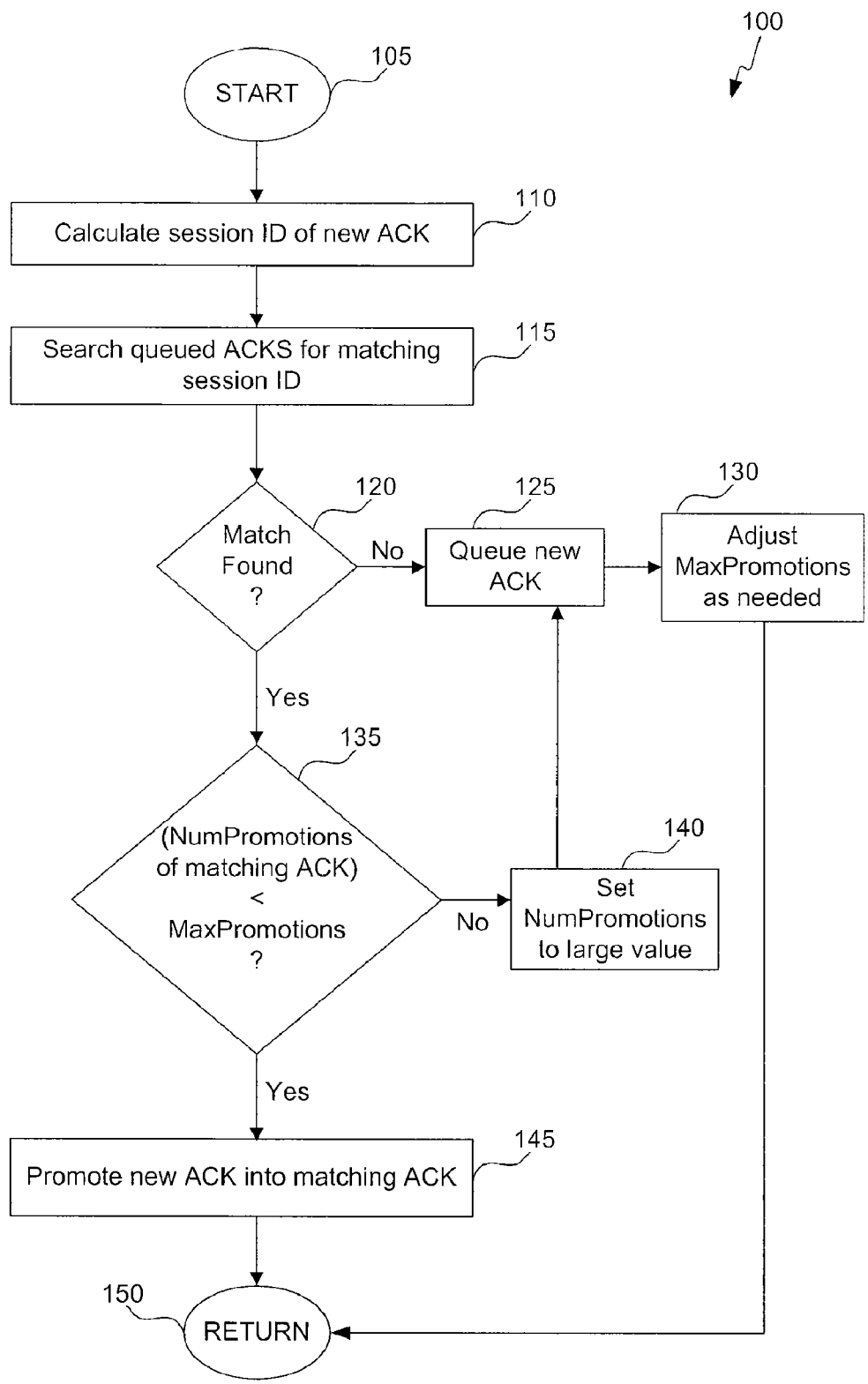
FIG. 1 is a flowchart illustrating the process of an embodiment of the invention.

The process of an embodiment of the invention is illustrated in FIG. 1. The process begins at step 105. In step 110, the session ID of a newly generated ACK packet is calculated. In step 115, any queued ACK packets are searched, to find those ACK packets having a session ID that match that of the new ACK packet. In step 120, a determination is made as to whether a match has been found. If no match is found, then in step 125, the new ACK packet is placed in the queue. In step 130, the parameter MaxPromotions is adjusted as necessary. Step 130 will be described in greater detail below.

If a match is found in step 120, then the process continues at step 135. Here, a determination is made as to whether NumPromotions for a matching ACK packet is less than MaxPromotions. If not, then the process proceeds to step 140, where NumPromotions is set to an arbitrarily large value that will always exceed MaxPromotions. Under these circumstances, with a large NumPromotions, the matching ACK packet will receive no promotions of new ACK packets. This is useful because MaxPromotions can increase over time, as will be discussed with respect to step 130 and FIG. 2 below. When NumPromotions for a queued ACK packet is greater than or equal to MaxPromotions, it is desirable to effectively lock that queued ACK packet, so that no further new ACK packets can be promoted into this queued ACK packet. Failing to do this would allow new ACK packets to be promoted ahead of older ACK packets if MaxPromotions grows. On the other hand, if NumPromotions is not greater than MaxPromotions, and if MaxPromotions grows, then promotions should be allowed. Thus, the evaluation of whether NumPromotions has reached MaxPromotions is deferred as long as possible, but once this condition is detected, the queued ACK packet needs to be locked to prevent additional promotions into it.

The process then proceeds to step 125, where the new ACK packet is placed in the queue. In step 130, the parameter MaxPromotions is adjusted as necessary.

If, in step 135, NumPromotions for the matching ACK packet is less than MaxPromotions, then the process continues to step 145. Here, the new ACK packet is promoted into the ACK packet having the matching session ID. Step 145 is described in greater detail below. The process concludes at step 150.

Figure 2:
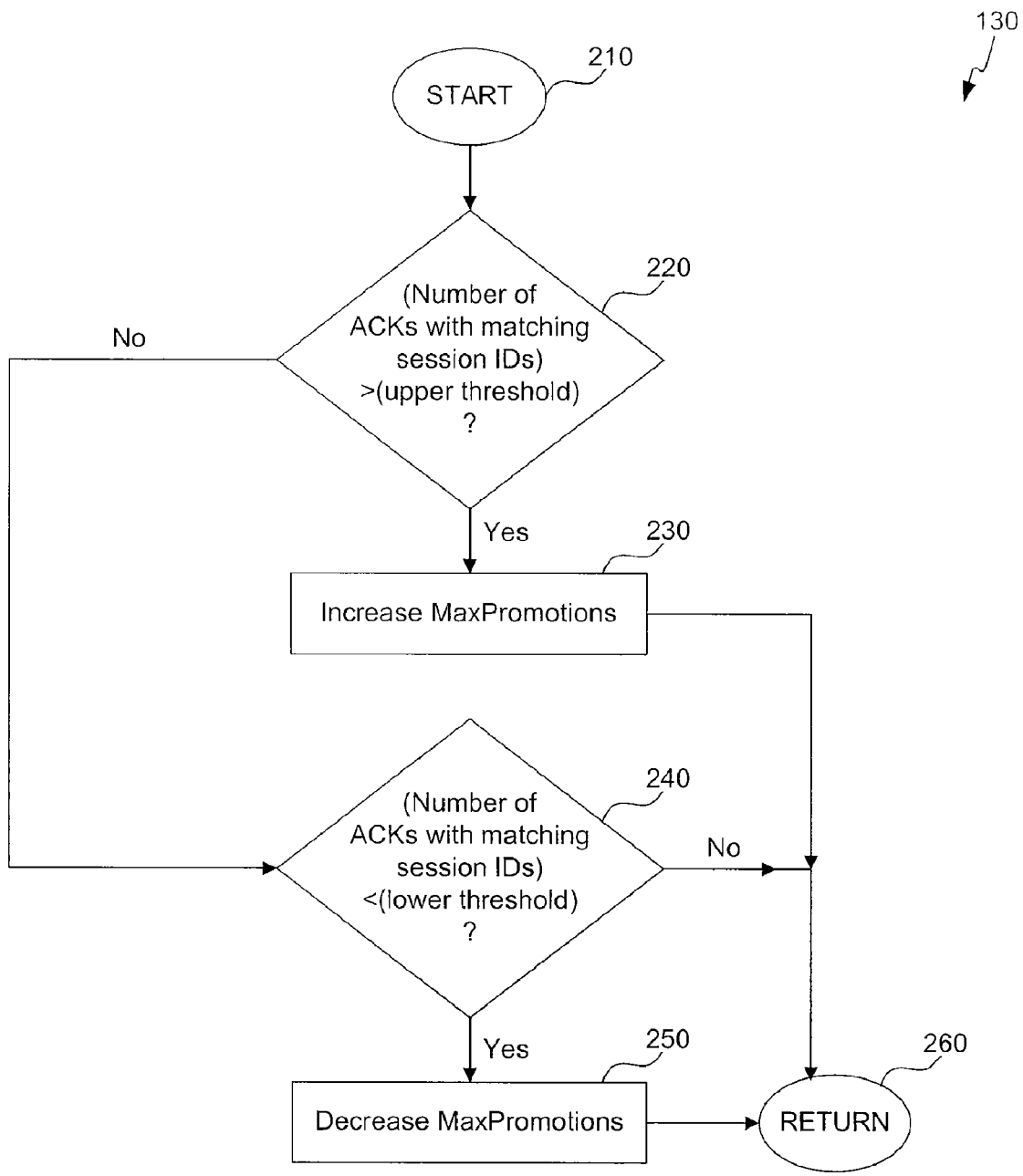
FIG. 2 is a flowchart illustrating the adjustment of parameters related to process of FIG. 1, according to an embodiment of the invention.

Step 130, the step of adjusting the parameter MaxPromotions, is illustrated in FIG. 2, according to an embodiment of the invention. This process begins at step 210. In step 220, a determination is made as to whether the number of queued ACK packets having a session ID matching that of the new ACK packet is greater than or equal to a predefined upper threshold. If so, then in step 230, MaxPromotions is increased. This allows more ACK filtering, which is desirable given a significantly high number of queued ACK packets for a given session.

If, in step 220, it is determined that the number of queued ACK packets having a session ID matching that of the new ACK packet is not greater than the predefined upper threshold, then the process proceeds to step 240. Here, a determination is made as to whether the number of queued ACK packets having a session ID matching that of the new ACK packet is less than or equal to a predefined lower threshold. If so, then MaxPromotions is decreased. This reduces the amount of ACK filtering. The process concludes at step 260.

Figure 3:
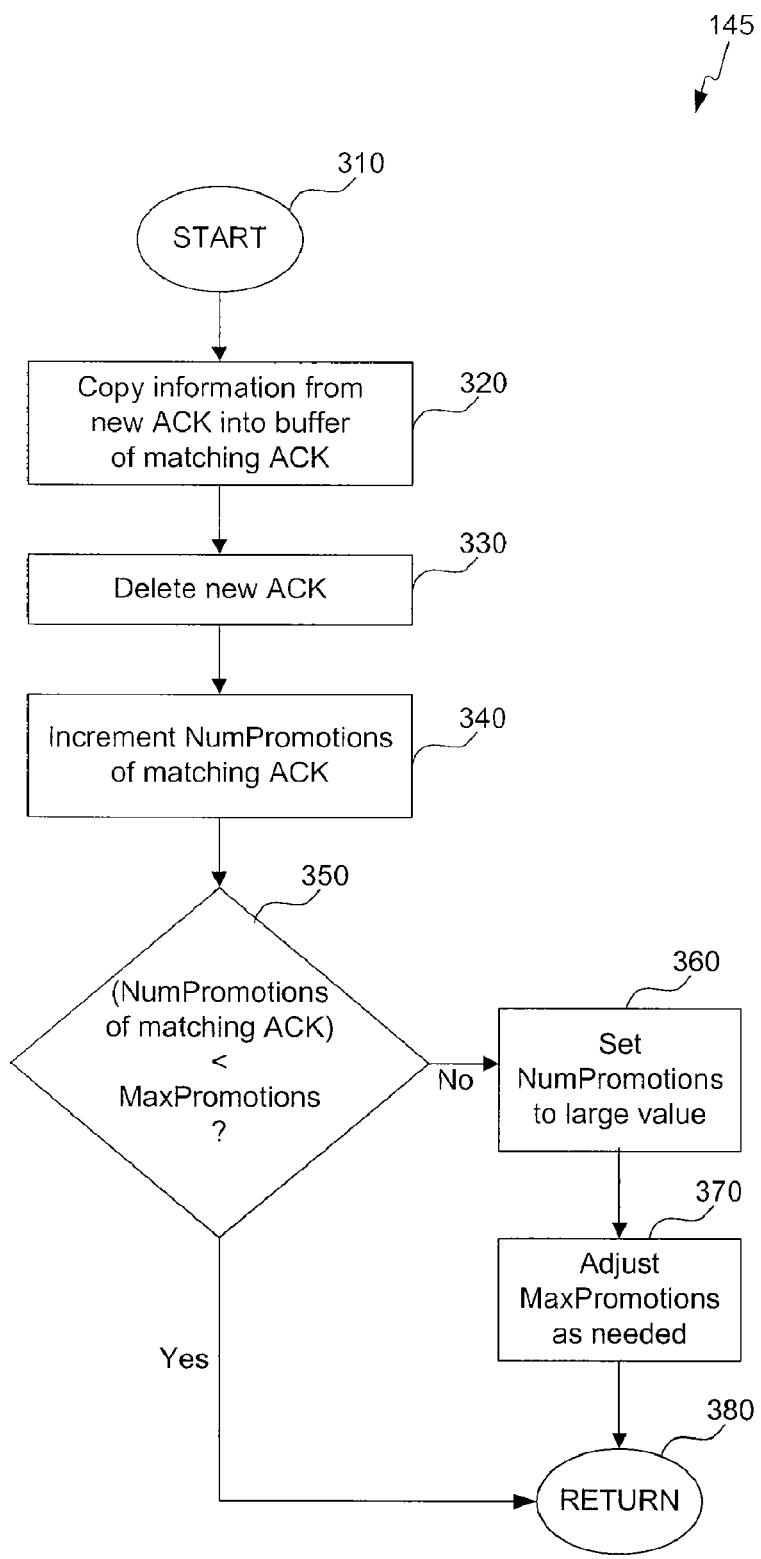
FIG. 3 is a flowchart illustrating the promotion of an ACK packet, according to an embodiment of the invention.

Step 145, the promotion of the new ACK packet into an ACK packet having a matching session ID, is illustrated in FIG. 3, according to an embodiment of the invention. This process starts at step 310. In step 320, information from the new ACK packet is copied into the buffer corresponding to the ACK packet having the matching session ID. This information would include, for example, the identity of the received data that is being acknowledged by the new ACK packet. In step 330, the new ACK packet can be deleted. In step 340, NumPromotions of the ACK packet having the matching session ID is incremented, to record the fact that one more promotion into this ACK packet has taken place. In step 350, a determination is made as to whether NumPromotions for a matching ACK packet is less than MaxPromotions. If not, then the process proceeds to step 360, where NumPromotions is set to an arbitrarily large value that will always exceed MaxPromotions. In step 370, the parameter is adjusted as necessary, in the same manner as step 130 (and illustrated in FIG. 2). The process concludes at step 380.

Figure 4:
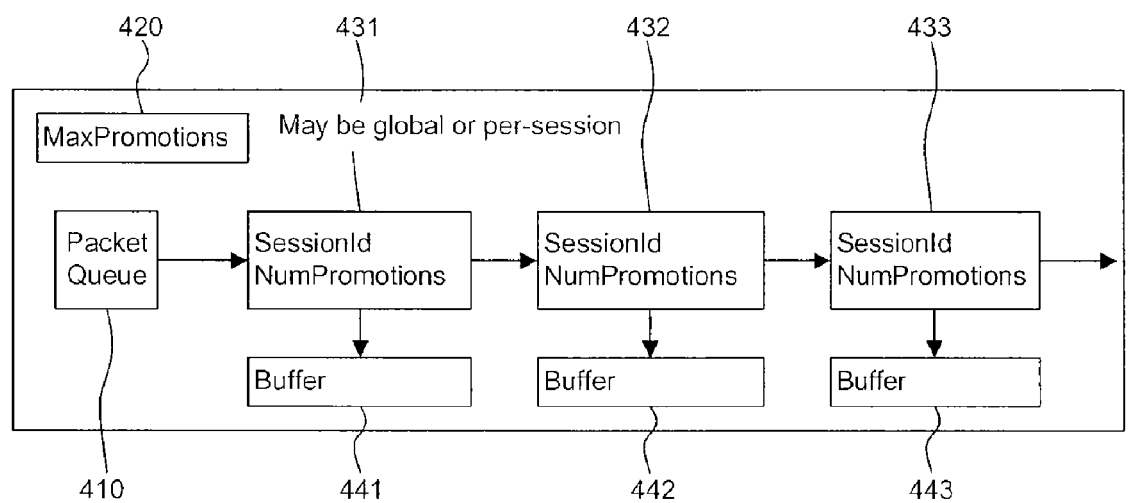
FIG. 4 illustrates a queue of ACK packets and accompanying buffers and parameters, according to an embodiment of the invention.

An example of this process is shown in FIG. 4. Here, a packet queue 410 contains three ACK packets (431, 432, and 433) to be transmitted. Associated with each ACK packet is a session ID and a variable NumPromotions. Ordinarily, if no filtering is taking place, each ACK packet is stored in its own buffer (441, 442, and 443 respectively). For a new ACK packet in the queue, where the new ACK packet has the same session ID as a currently queued ACK packet, fields may copied from the new ACK packet, into the buffer that contains the already queued ACK packet under circumstances described below. NumPromotions is incremented as necessary for the ACK packet into which the new ACK has been promoted.

A goal of Dynamically Adjusting ACK Filtering is to do very little filtering while a TCP session starts up (minimizing inter-packet delay, yielding good ACK pacing for the server), and then to get more aggressive with filtering as the session throughput increases. When a TCP data packet is lost, the overall throughput will decline (as packets are retransmitted), so the filter needs to become less aggressive, allowing the client and server to recover and quickly ramp back up to full throughput.

Initially, MaxPromotions (shown as variable 420) will be set to zero. This configures the system to allow no promotions, which effectively disables filtering. When an ACK packet is queued to be transmitted, NumPromotions is set to zero, since no ACKs have yet been promoted into the queue.

As a new ACK packet becomes available for transmission upstream, the CM calculates the session ID and searches the list of queued packets for a match. If a match is found, the NumPromotions variable is compared to MaxPromotions, and if NumPromotions is less, the ACK will be filtered (promoting data fields into the queued ACK), and NumPromotions for that buffer will be incremented. If the new value for NumPromotions is equal to MaxPromotions, NumPromotions may be set to a value greater than MaxPromotions, to prevent future ACKs from being promoted. This continues until the end of the queue is reached. If any promotions occurred, the new ACK packet is discarded; otherwise, the new ACK packet is queued.

The aggressiveness of the ACK Filter is made dynamic by adjusting the value of MaxPromotions. While walking through the list of queued packets, the number of session ID matches is tracked. If this value is at or above an upper threshold, MaxPromotions is increased. This allows more promotions, i.e., more filtering, when the number of queued ACKs is large. If this value is at or below a lower threshold, MaxPromotions is decreased. This limits the amount of filtering when the number of queued ACKs is small.

In an embodiment of the invention, the upper threshold is two, so MaxPromotions can be increased by one if the number of session ID matches is two or greater. This causes the filter to become more aggressive gradually, and only as the rate of ACK packets increases (exceeding the transmission rate). In an embodiment of the invention, MaxPromotions can be decreased to zero if the queue is empty. This causes the filter to turn itself off when the upstream pipe is empty. In alternative embodiments, other threshold values, conditions, and increase/decrease amounts could be used, and may be determined by empirical testing and analysis.

Example

Figure 5A:
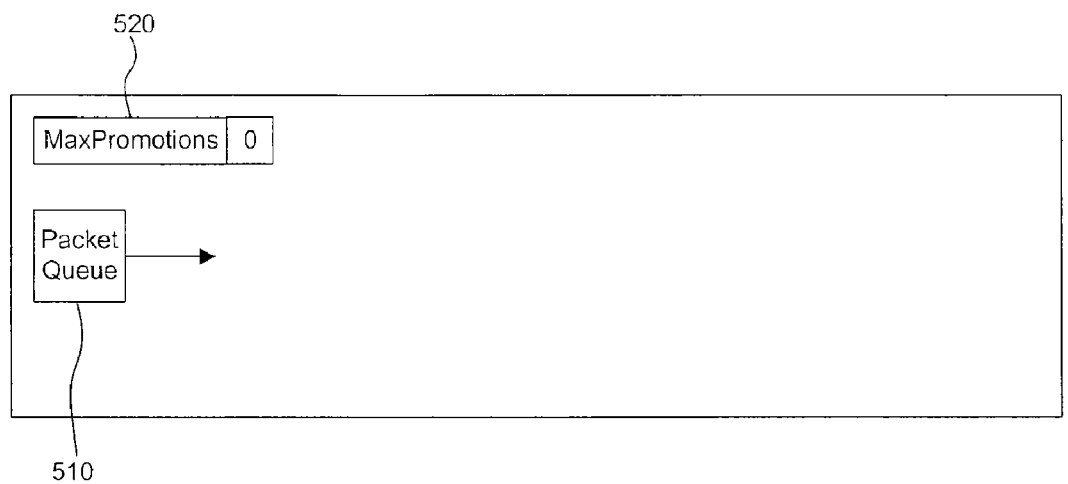
FIGS. 5A-5I illustrate an example of the processing of an embodiment of the invention.

Below is an example showing the operation of dynamically adjusted ACK filtering, according to an embodiment of the invention. In this example, we assume that all ACK packets have a session ID of 1. Initially, as shown in FIG. 5A, the packet queue 510 is empty, and MaxPromotions (variable 520) is 0.

Figure 5B:
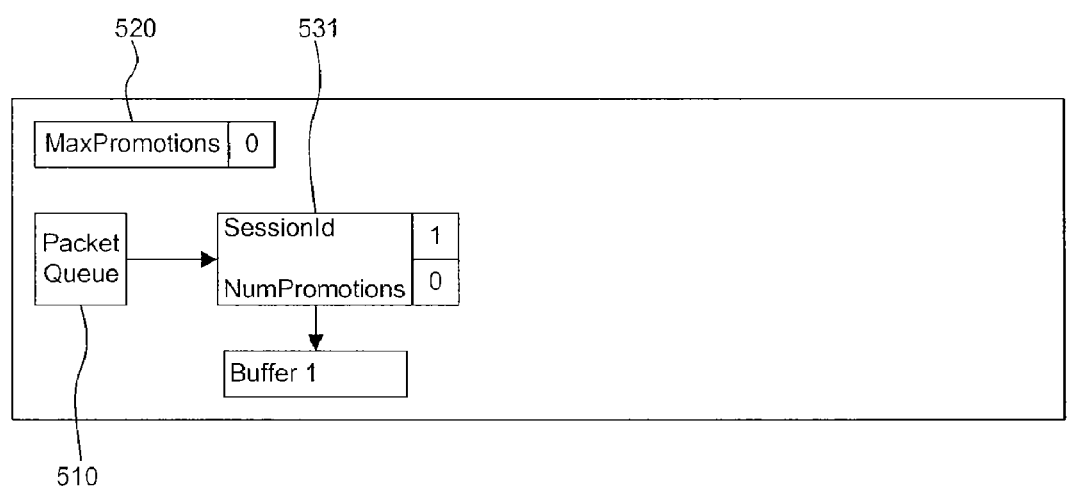

In FIG. 5B, ACK packet 1 (shown as packet 531) arrives for transmission; since the queue is empty, there are no session ID matches, and the packet is simply queued and stored in buffer 1.

Figure 5C:
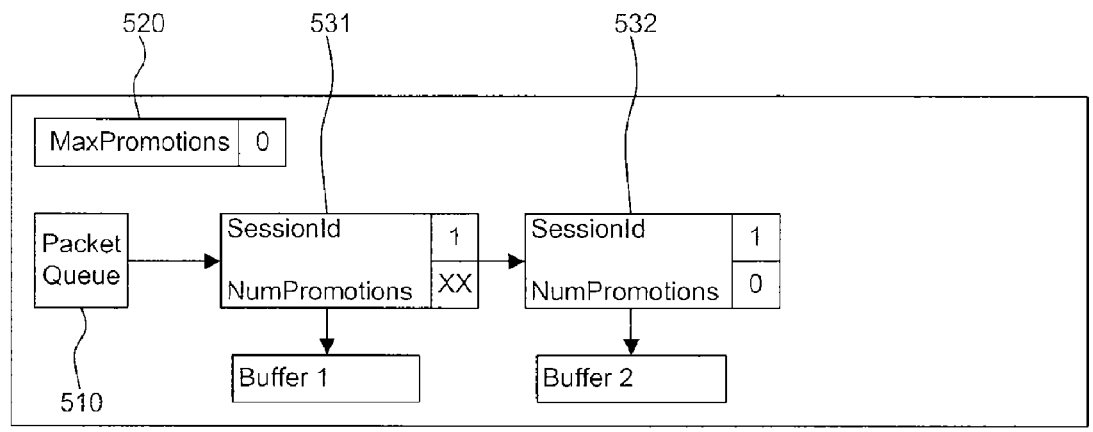

In FIG. 5C, ACK packet 532 arrives for transmission before ACK packet 531 is sent. The session ID of ACK packet 532 matches the session ID of ACK packet 531, and NumPromotions for ACK packet 531 is compared to MaxPromotions. The former value is zero (as seen in previous FIG. 5B) and is therefore equal to the latter value, so ACK packet 532 is not promoted ACK packet 531, i.e., into buffer 1. The NumPromotions counter for ACK packet 531 is set to a large value (represented by XX) so that future promotions into ACK packet 531 will not occur. Such promotions are not to be permitted, because NumPromotions for ACK packet 531 was not lower than the maximum number of promotions indicated by MaxPromotions. Reaching the end of the queue, there are no promotions, so the buffer for ACK 532 is queued. Since there is only one session ID match, MaxPromotions is not changed.

Figure 5D:
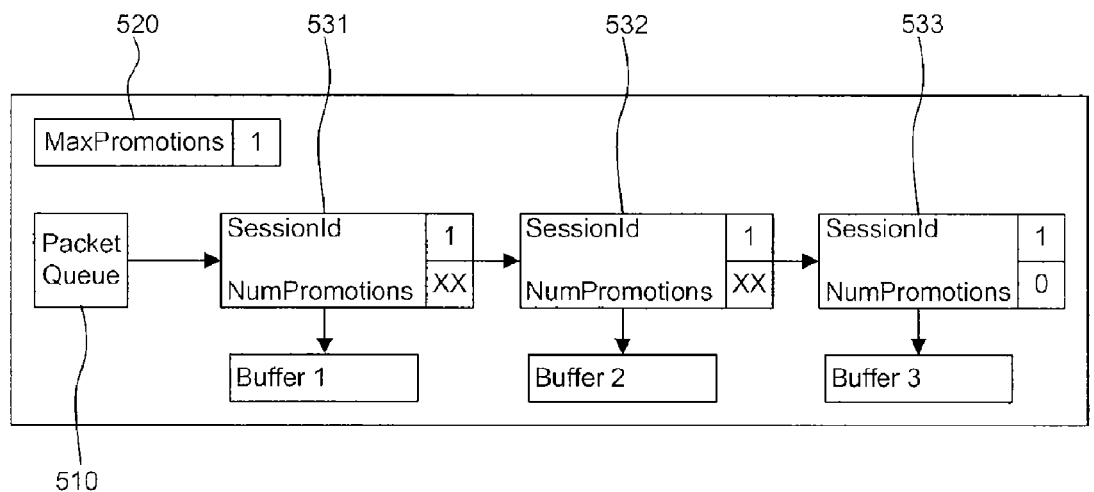

In FIG. 5D, ACK packet 533 arrives for transmission before ACK packets 531 and 532 are sent. We find matching session IDs for both queued ACK packets. For packet 531, NumPromotions is larger than MaxPromotions, so we do not promote ACK packet 533 into buffer 1. Likewise for packet 2, NumPromotions is equal to MaxPromotions, so we set it to a large value (XX) and do not promote into buffer 2. Reaching the end of the queue, there are no promotions, so the buffer for ACK packet 533 is queued. There were two session ID matches. Assuming an upper threshold of two, this allows us to increment MaxPromotions from zero to one, thereby permitting a future promotion.

Figure 5E:
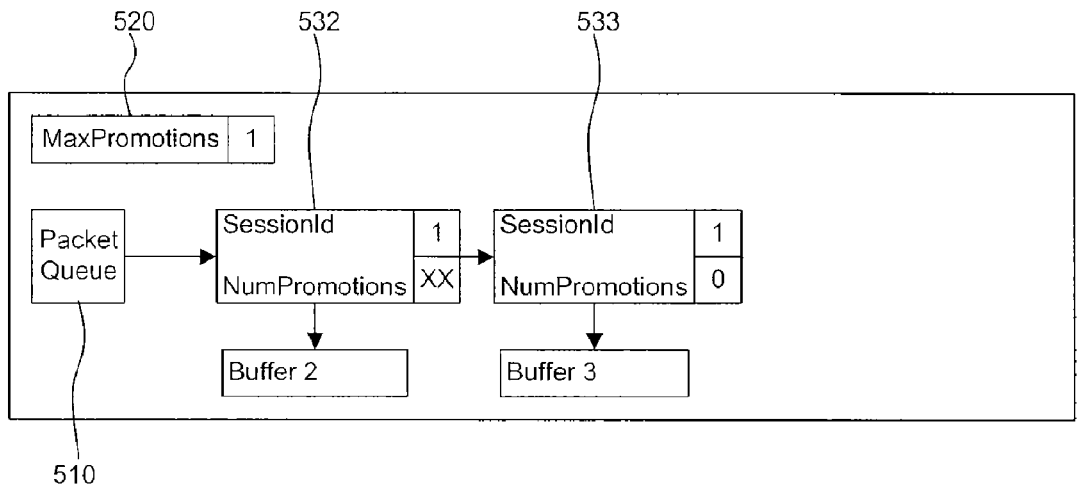

At this point, ACK packet 531 is transmitted to the network, leaving ACK packets 532 and 533 awaiting transmission. This is shown in FIG. 5E. Neither of the filtering parameters are adjusted.

Figure 5F:
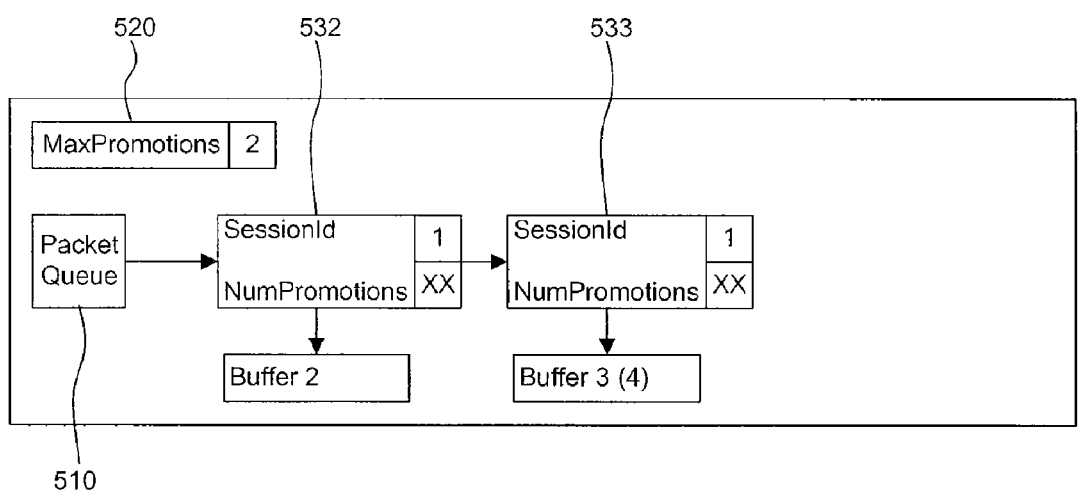

In FIG. 5F, ACK packet 534 arrives for transmission before ACK packets 532 and 533 are sent. We find matching session IDs for both queued ACK packets. For ACK packet 532, NumPromotions is larger than MaxPromotions, so ACK packet 534 is not promoted into buffer 2. For packet 533, NumPromotions is zero, as shown in FIG. 5E, and is therefore less than MaxPromotions. ACK packet 534 is therefore promoted into buffer 3, and NumPromotions for ACK packet 533 is incremented to one. This is equal to MaxPromotions, so we set NumPromotions for ACK packet 533 to a large value (XX) to prevent further promotions, as shown in FIG. 5F. Reaching the end of the queue, there was one promotion, and the buffer for ACK packet 534 is discarded. There were two session ID matches. If the upper threshold is predefined as two, this allows an increment of MaxPromotions, from one to two.

Figure 5G:
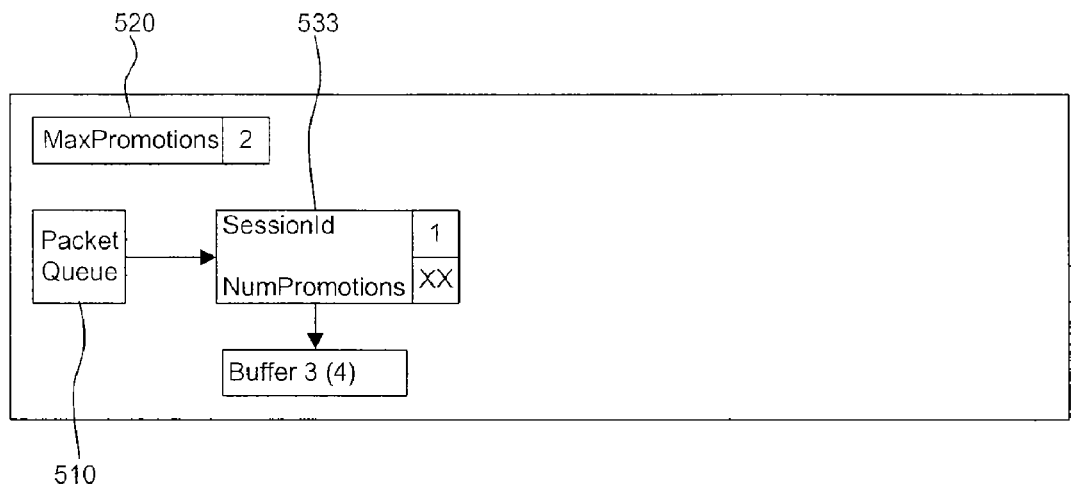

In FIG. 5G, ACK packet 532 is transmitted to the network, leaving ACK packet 533 (which contains data for ACK packet 534 that would otherwise have been stored in a buffer 4) awaiting transmission. None of the filtering parameters are adjusted.

Figure 5H:
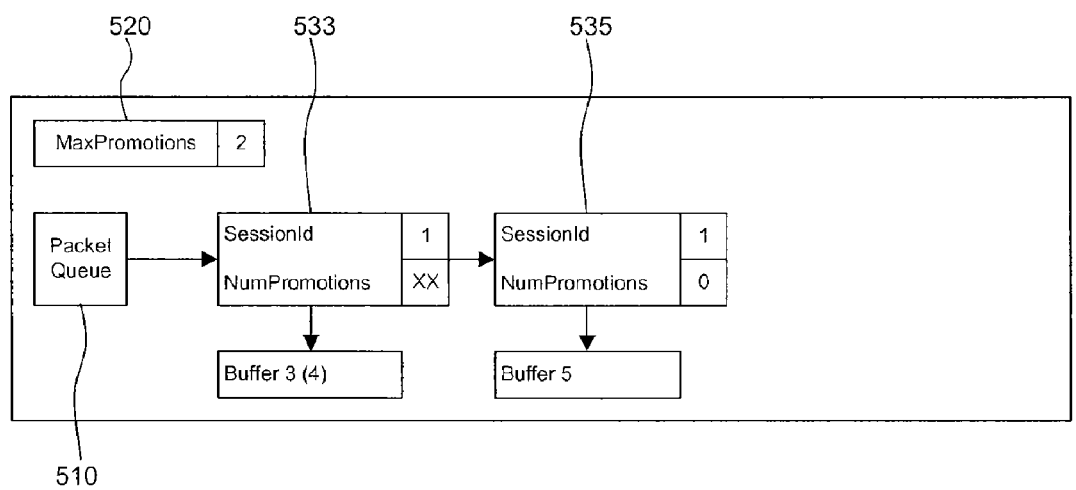

In FIG. 5H, ACK packet 535 arrives for transmission before ACK packet 533 is sent. We find a matching session ID, and NumPromotions for ACK packet 533 is larger than MaxPromotions, so ACK packet 535 is not promoted into buffer 3. Reaching the end of the queue, there were no promotions, so the buffer for ACK packet 535 is queued. There was one session ID match, so MaxPromotions is not changed.

Figure 5I:
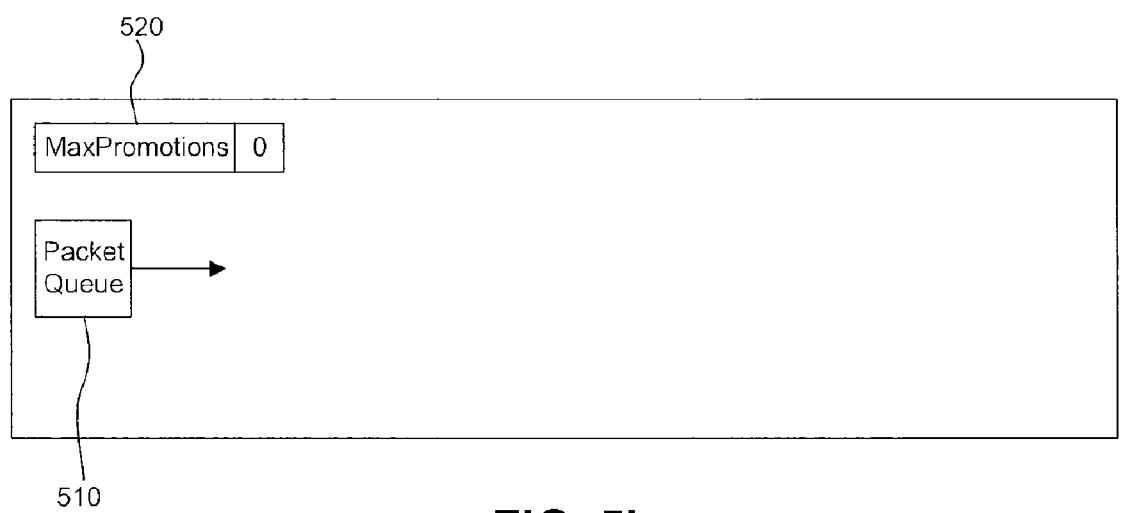

In FIG. 5I, ACK packets 533 and 535 are sent to the network, leaving the queue empty. This causes MaxPromotions to be decreased to zero.

Computing Context

Figure 6:
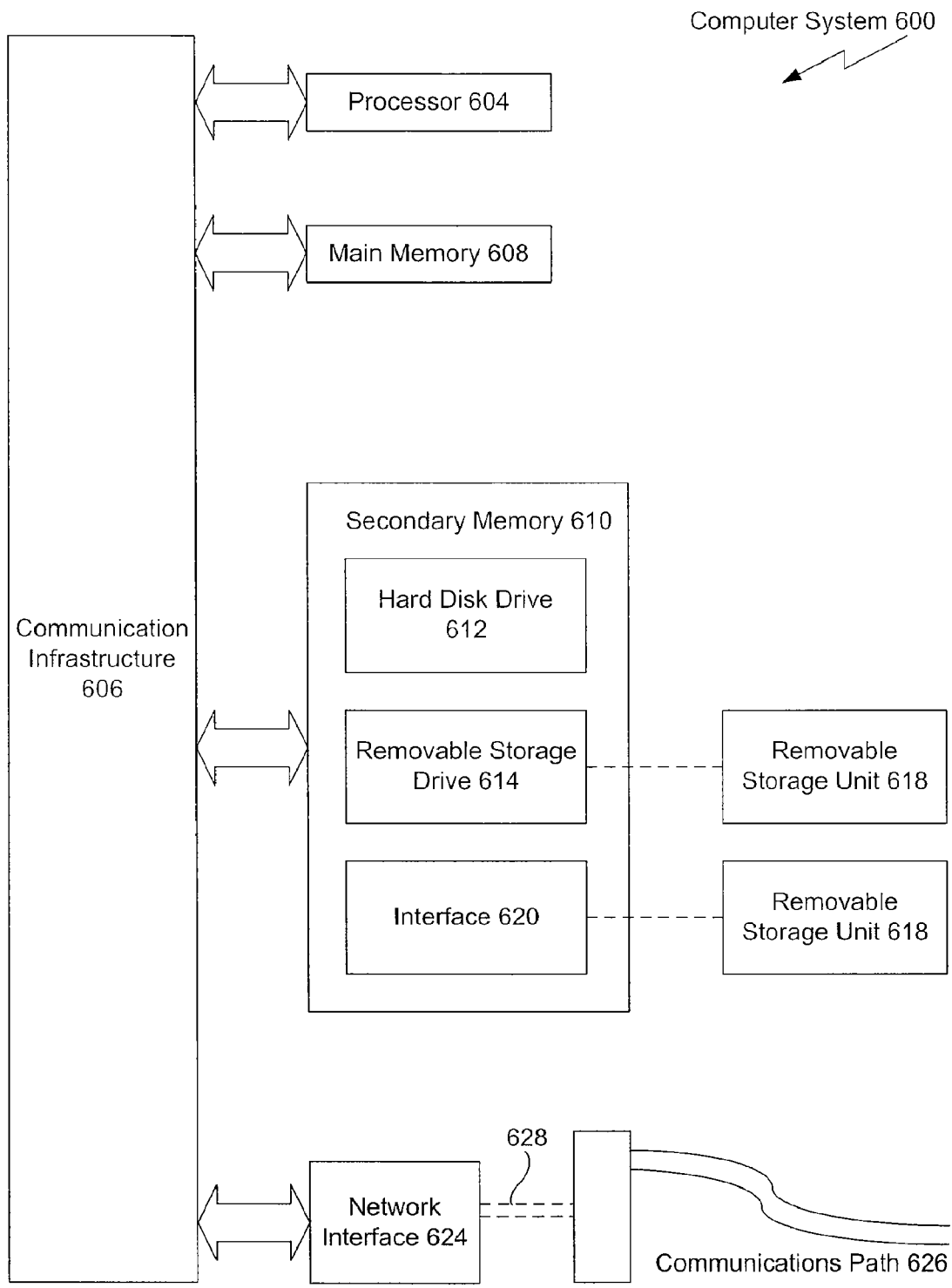
FIG. 6 is a block diagram illustrating the computing context of an embodiment of the invention.

In an embodiment of the present invention, the system and components of the present invention described herein are implemented using well known computers, such as a computer 600 shown in FIG. 6. The computer 600 can be any commercially available and well known computer capable of performing the functions described herein.

The computer 600 includes one or more processors (also called central processing units, or CPUs), such as a processor 604. The processor 604 is connected to a communication bus or infrastructure 606. The computer 600 also includes a main or primary memory 608, such as random access memory (RAM). The primary memory 608 has stored therein control logic (computer software), and data.

The computer 600 also includes one or more secondary memory storage devices 610. The secondary storage devices 610 include, for example, a hard disk drive 612 and/or a removable storage device or drive 614. The removable storage drive 614 represents a compact disk drive, an optical storage device, tape backup, or other device that is configured to read from and/or write to a removable storage medium 618.

The removable storage drive 614 interacts with a computer useable or readable removable storage medium 618 having stored therein computer software (control logic) and/or data. Removable storage medium 618 represents a compact disk, DVD, optical storage disk, or any other computer data storage device. The removable storage drive 614 reads from and/or writes to the removable storage medium 618 in a well known manner.

The computer 600 further includes a communication or network interface 624. The network interface 624 enables the computer 600 to communicate with remote devices. For example, the network interface 624 allows the computer 600 to communicate over communication networks or mediums 628, such as LANs, WANs, a cable network, the Internet, etc. The network interface 624 may interface with remote sites or networks via wired or wireless connections. Interface 624 can also be used as the input and output point for data that is used and/or manipulated by the processes described above, such as acknowledgements or data related thereto.

Control logic may be transmitted to and from the computer 600 via the communication path 626. More particularly, the computer 600 may receive and transmit carrier waves (electromagnetic signals) modulated with control logic via the communication path 626.

Any apparatus or manufacture comprising a computer useable or readable medium having control logic (software) stored therein is referred to herein as a computer program product or program storage device. This includes, but is not limited to, the computer 600, the main memory 608, the hard disk 612, and the removable storage medium 618. As noted above, carrier waves can also be modulated with control logic. Computer program products, having control logic stored therein that, when executed by one or more data processing devices, cause such data processing devices to operate as described herein, represent embodiments of the invention. In an embodiment of the invention, this control logic would control the calculation of the session ID, the search of queued acknowledgements for those with a matching session ID, the promotion process, the manipulation of NumPromotions and MaxPromotions, and any or all of the other operations described above.

The invention can work with software, hardware, and/or operating system implementations other than those described herein. Any software, hardware, and operating system implementations suitable for performing the functions described herein can be used.

CONCLUSION

It is to be appreciated that the Detailed Description section, and not the Abstract section, is intended to be used to interpret the claims. The Abstract section may set forth one or more but not all exemplary embodiments of the present invention as contemplated by the inventor, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method of adjusting acknowledgement filtering, comprising:
    searching, by an electronic device, a list of queued acknowledgements for a matching queued acknowledgement, the matching queued acknowledgement having a session ID that matches a session ID of a new acknowledgement;
       comparing, by the electronic device, a number of previous promotions for the matching queued acknowledgement with a maximum number of promotions; and
    promoting, by the electronic device, the new acknowledgement into the matching queued acknowledgement if the number of previous promotions for the matching queued acknowledgement is less than the maximum number of promotions.

2. The method of claim 1, wherein said promoting comprises:
    copying information from the new acknowledgement into a buffer of the matching queued acknowledgement;
    deleting the new acknowledgement; and
    incrementing the number of previous promotions for the matching queued acknowledgement.

3. The method of claim 1, further comprising:
    if the number of matching queued acknowledgements is greater than an upper threshold, increasing the maximum number of promotions; and
    if the number of matching queued acknowledgements is less than a lower threshold, decreasing the maximum number of promotions.

4. The method of claim 1, further comprising:
    queuing, by the electronic device, the new acknowledgement if the new acknowledgement is not promoted into the matching queued acknowledgement.

5. The method of claim 1, wherein the maximum number of promotions is one of a global value and a per-session value.

6. The method of claim 1, further comprising:
    locking the matching acknowledgement if the number of previous promotions for the matching queued acknowledgement is not less than the maximum number of promotions.

7. The method of claim 6, wherein the locking comprises:
    setting the number of previous promotions to a large value that always exceeds the maximum number of promotions.

8. A computer program product comprising a non-transitory computer useable medium having processing instructions stored thereon, that, in response to execution by one or more processors, cause the one or more processors to adjust acknowledgement filtering, the processing instructions comprising:
    processing instructions for causing the one or more processors to search a list of queued acknowledgements for a matching queued acknowledgement, the matching queued acknowledgement having a session ID that matches a session ID of a new acknowledgement;
    processing instructions for causing the one or more processors to
       compare a number of previous promotions for the matching queued acknowledgement with a maximum number of promotions; and
    processing instructions for causing the one or more processors to promote the new acknowledgement into the matching queued acknowledgement if the number of previous promotions for the matching queued acknowledgement is less than the maximum number of promotions.

9. The computer program product of claim 8, wherein the processing instructions for causing the one or more processors to promote comprises:
    copying information from the new acknowledgement into a buffer of the matching queued acknowledgement;
    deleting the new acknowledgement; and
    incrementing the number of previous promotions for the matching queued acknowledgement.

10. The computer program product of claim 8, further comprising:
    processing instructions for causing the one or more processors to increase the maximum number of promotions if the number of matching queued acknowledgements with matching session IDs is greater than an upper threshold; and processing instructions for causing the one or more processors to decrease the maximum number of promotions if the number of matching queued acknowledgements with matching session IDs is less than a lower threshold.

11. The computer program product of claim 8, further comprising:

processing instructions for causing the one or more processors to queue the new acknowledgement if the new acknowledgement is not promoted into the matching queued acknowledgement.

12. The computer program product of claim 8, wherein the maximum number of promotions is one of a global value and a per-session value.

13. The computer program product of claim 8, further comprising:

processing instructions for causing the one or more processors to lock the matching acknowledgement if the number of previous promotions for the matching queued acknowledgement is not less than the maximum number of promotions.

14. The computer program product of claim 13, wherein the processing instructions for causing the one or more processors to lock comprises:

setting the number of previous promotions to a large value that always exceeds the maximum number of promotions.

15. A system for adjusting acknowledgement filtering, comprising:

a processor; and a memory in communication with said processor, said memory for storing a plurality of processing instructions for directing said processor to:

search a list of queued acknowledgements for a matching queued acknowledgement having a session ID that matches a session ID of a new acknowledgement;

compare a number of previous promotions for a matching queued acknowledgement with a maximum number of promotions; and promote the new acknowledgement into the matching queued acknowledgement if the number of previous promotions for the matching queued acknowledgement is less than the maximum number of promotions.

16. The system of claim 15, wherein said processing instructions for directing said processor to promote comprises processing instructions for directing said processor to:

copy information from the new acknowledgement into a buffer of the matching queued acknowledgement;

delete the new acknowledgement; and increment the number of previous promotions for the matching queued acknowledgement.

17. The system of claim 15, wherein said memory in communication with said processor further stores processing instructions for directing said processor to:

if the number of matching queued acknowledgements is greater than an upper threshold, increase the maximum number of promotions; and if the number of matching queued acknowledgements is less than a lower threshold, decrease the maximum number of promotions.

18. The system of claim 15, wherein said memory in communication with said processor further stores processing instructions for directing said processor to:

queue the new acknowledgement if the new acknowledgement is not promoted into the matching queued acknowledgement.

19. The system of claim 15, wherein the maximum number of promotions is one of a global value and a per-session value.

20. The system of claim 15, wherein said memory in communication with said processor further stores processing instructions for directing said processor to:

lock the matching acknowledgement if the number of previous promotions for the matching queued acknowledgement is not less than the maximum number of promotions.

21. The system of claim 20, wherein said memory in communication with said processor further stores processing instructions for directing said processor to lock comprises:

processing instructions for directing said processor to set the number of previous promotions to a large value that always exceeds the maximum number of promotions.

* * * * *